United States Patent
Gustafson, Jr. et al.

(10) Patent No.: US 6,167,916 B1
(45) Date of Patent: Jan. 2, 2001

(54) MULTI-PURPOSE UNDERGROUND UTILITY CONDUIT SYSTEM

(76) Inventors: Thomas F. Gustafson, Jr., 4901 N. Federal Hwy., Suite 440, Fort Lauderdale, FL (US) 33308; John J. Barr, 12113 Indian Mound Rd., Lakeworth, FL (US) 33467; Walter D. Keller, P.O. Box 9740, Coral Springs, FL (US) 33075

( * ) Notice: Under 35 U.S.C. 154(b), the term of this patent shall be extended for 0 days.

(21) Appl. No.: 09/289,739

(22) Filed: Apr. 12, 1999

(51) Int. Cl.[7] .............................. F16L 11/00; E02D 29/00; B63B 35/03
(52) U.S. Cl. ......................... 138/117; 405/149; 405/154
(58) Field of Search .................................. 405/154, 156; 52/20, 169.1, 220.1, 220.3; 138/117, 105–107

(56) References Cited

U.S. PATENT DOCUMENTS

| | | | |
|---|---|---|---|
| 1,987,517 | * | 1/1935 | Porter et al. ......................... 138/157 |
| 3,793,793 | * | 2/1974 | Dobbins ............................... 138/117 |
| 5,092,710 | * | 3/1992 | Matiere ............................... 138/105 |
| 5,507,590 | * | 4/1996 | Argandona ............................. 52/20 |
| 5,761,872 | * | 6/1998 | Sanford et al. ........................ 52/694 |

* cited by examiner

*Primary Examiner*—Andres Kashnikow
*Assistant Examiner*—Davis Hwu
(74) *Attorney, Agent, or Firm*—M. K. Silverman

(57) ABSTRACT

A method of housing various utility services within a single unitary structure includes the steps of disposing such services within an integral longitudinal conduit having subconduits, each corresponding to a utility service or utility service group to be provided. Further providing, to earth-embedded surfaces of the integral conduit, elements for stabilization of the conduit within the earth; and providing, to upwardly directed, non-embedded surfaces of the conduit, a substantially flat surface including surface effects to aesthetically and functionally integrate into a surface environment associated with the conduit.

14 Claims, 6 Drawing Sheets

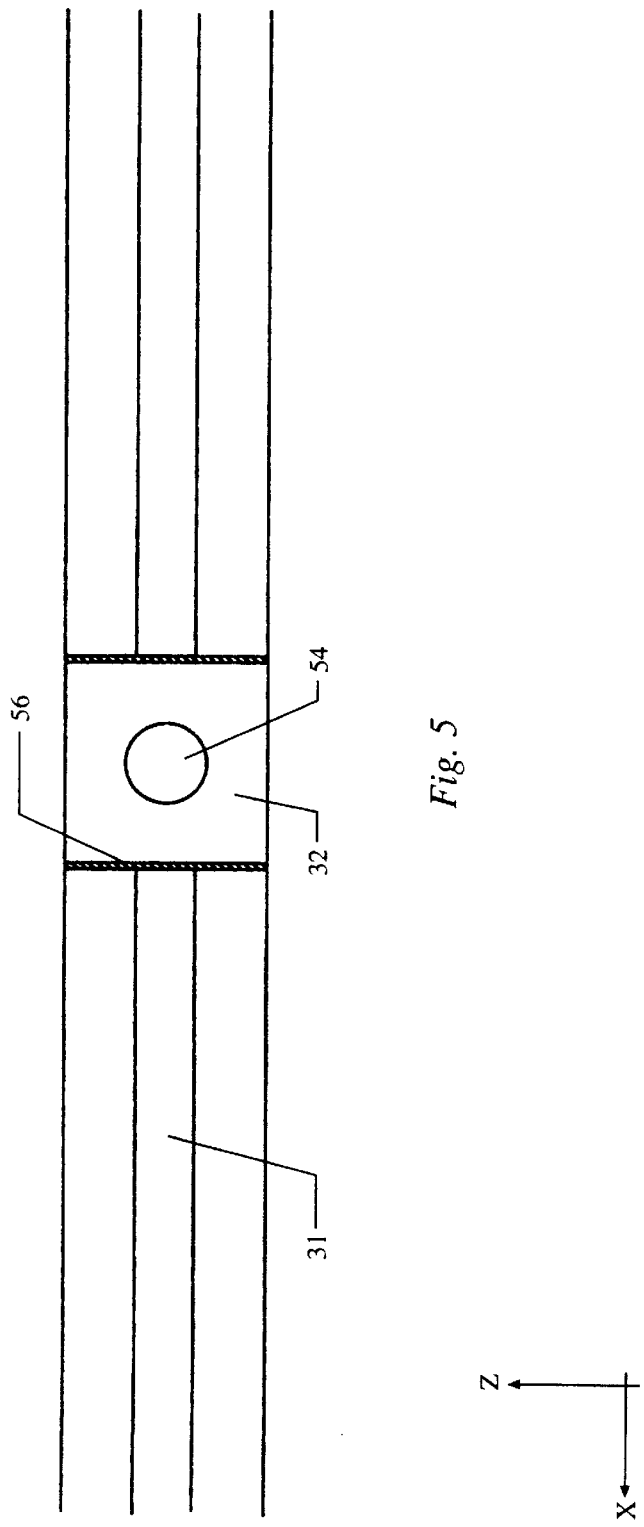
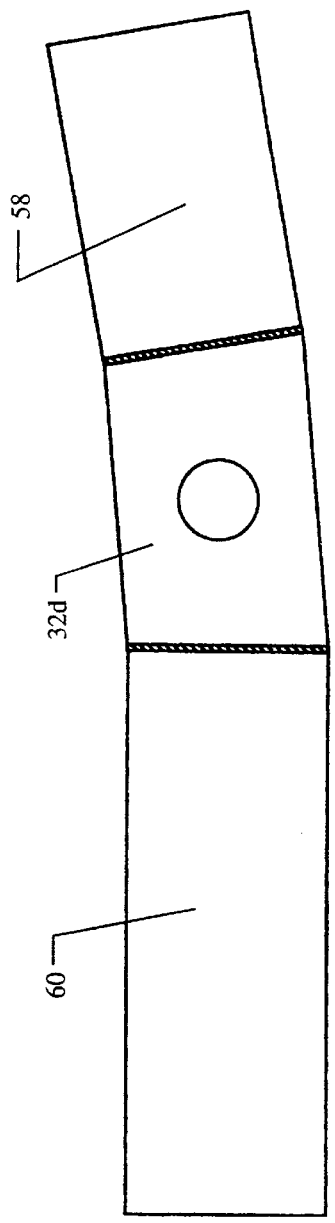

MULTI-PURPOSE UNDERGROUND UTILITY CONDUIT SYSTEM

BACKGROUND OF THE INVENTION

1. Field of the Invention

The instant invention relates to the area of civil engineering and, more particularly, to a multi-use conduit system for the protection and integrated transmission or movement of various utilities, information or services whether solids, liquid, gas, fiber optic, magnetic, or electronic in nature. The same has particular application for location beneath transportation corridors and open space.

2. Description of Related Art

To the knowledge of the within inventors there has not existed in the prior art a multi-utility conduit system, and certainly has not existed a multi-purpose underground utility conduit system particularly adapted for disposition beneath the transportation corridor and open space. Therefore, to the knowledge of the inventors, the most applicable prior art relates to systems comprising a plurality of integral contiguous channels as, for example, exists in chemical engineering applications where it is desirable to simultaneously discharge or convey to a remote location a plurality of different fluids and gases, each typically hazardous or toxic, within a single integrated containment system. An example of such prior art appears in U.S. Pat. No. 4,751,945 (1988) to Williams, entitled Dual Containment Channel For Fluids. However, with respect to general civil engineering applications, that is, applications in which it is desirable to integrate into a single advantageously located utility conduit, substantially all utility and information services requirements of a community, e.g., electric power cables; drinking water, re-use water and sewer lines, storm water and drainage pipes; natural or synthetic gas lines; telephone, cable television, fiber optic and other communication and data transmission channels; pneumatic tubes; security services; fire services; a low current magnetic conductive track for vehicular propulsion, and storage, maintenance access or transit power equipment for the hybrid multi-use transit corridors, the prior art is entirely silent.

SUMMARY OF THE INVENTION

The present invention relates to a multi-purpose utility conduit system, definable in terms of an x, y, z Cartesian coordinate system, in which the utility conduit is typically symmetric about a yz or vertical plane, and in which an xz plane defines a truss-like structure having optionally removable lateral extremities. The inventive conduit system is proportioned to interface, at its x-axis extremities, with water drainage facilities and, proximal to said yz plane of the symmetry, with water main locations. Along the xy plane, that is, the ground level surface of the conduit system, is provided a layer of roadway material or equivalent thereof such as natural stone, tarmac or pre-manufactured brick, block or composite roadway material capable of supporting pedestrian, bicycle, and small greenway transit trains or service vehicles. Along the yz plane of symmetry is, in each embodiment of the invention, provided a central or primary, that is, large dimension sub-conduit together with smaller laterally (x-axis) disposed smaller sub-conduits within optional selectably attachable lateral extremities of the truss like structure of the conduit are included sub-conduits of smaller xz plane cross section which, thereby, are particularly suitable for use with all utility information and service requirements of a community such as: electric power cables; drinking water, re-use water and sewer lines, storm water drainage pipes; natural or synthetic gas lines; telephones service; cable television, and fiber optic communications and data transmission, pneumatic tubes; security services; fire services; low current magnetic inductive tracks for vehicular propulsion, and storage, maintenance access or transit power equipment for the ergonomic hybrid transit access corridors. The width (x-axis) and depth (z-axis) of the conduit system may be adapted in response to local ground conditions and design criteria, particularly relative to the parameters of the transportation corridor and open space which will typically overlay the conduit. In the y-axis or length dimension of the conduit are provided manhole-type points of access to the primary sub-conduit.

The invention is further definable as a method of housing a plurality of utility services within a single unitary channel, the method comprising the steps of: (a) disposing a plurality of utility services within a substantially integral longitudinal conduit having therein a plurality of sub-conduits each corresponding to a utility service or utility service group to be provided; (b) providing, to earth-embedded surfaces of said integral conduit, means for stabilization of said conduit within the earth; and (c) providing, to upwardly directed, non-embedded surfaces of said conduit, a substantially flat surface adapted in surface effect to aesthetically and functionally integrate into a surface environment associated with said conduit.

It is accordingly an object of the present invention to provide a conduit system having particular application underneath ergonomic hybrid transit access corridors as part of inner city and community center re-development efforts to effect the integration of all utilities aforementioned and services requirements of a planning region within a single utility delivery system.

It is another object to provide an integrated multi-purpose conduit system to provide, within a common conduit, all utilities, information and services requirement at an underground location which is easily accessible for purposes of service, maintenance and later modification thereof.

It is a further object of the invention to provide a conduit system of the above type which is compatible with, and integrable into, an ergonomic multi-use hybrid transit access corridor right-of-way.

It is a still further object to provide a conduit system of the above type which can be readily manufactured and simply installed at the construction site.

It is a yet further object to provide a conduit system of the above type which is modular and, at the ground level thereof, appears indistinguishable from the surface of a transportation corridor or other surfaces beneath which it is situated.

The above and yet other objects and advantages of the present invention will become apparent from the hereinafter set forth Brief Description of the Drawings and Detailed Description of the Invention.

BRIEF DESCRIPTION OF THE DRAWINGS

FIG. 5 is a top plan schematic view of the invention showing the appearance of an access segment thereof. FIG. 6 is a view, similar to that of FIG. 5, however showing the use of an access segment where x and y-axis adjoining conduit segments are not co-linear relative to each other.

DETAILED DESCRIPTION OF THE INVENTION

Figure 1:
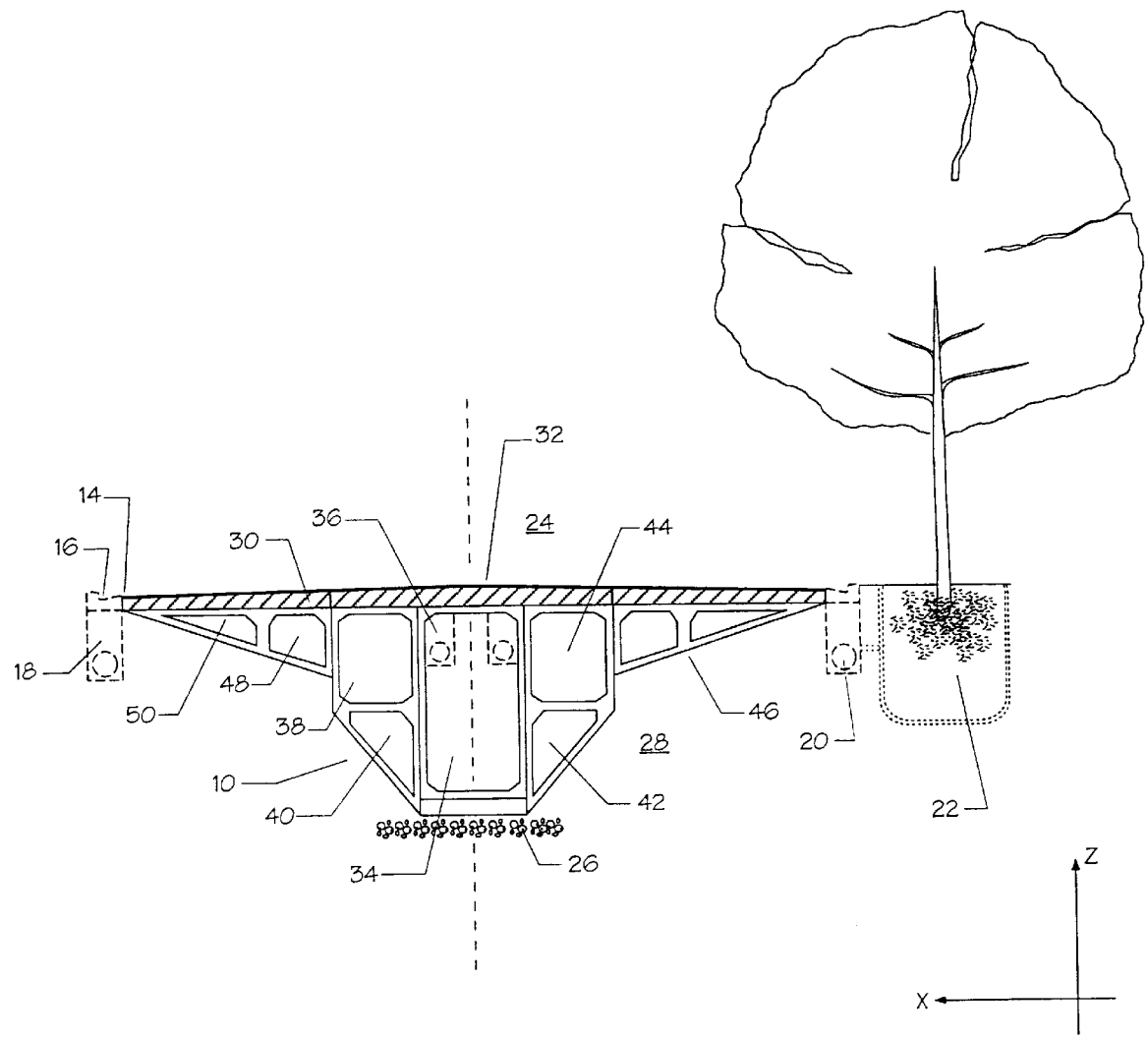
FIG. 1 is a xz plane cross-sectional view of a standard width, standard depth embodiment of the instant invention, showing detachable lateral segments thereof.

With reference to FIG. 1, the instant inventive multi-purpose utility conduit system 10 may be seen in cross-section to comprise a truss-like structure which is largest along a yz plane of symmetry 12 and which tapers symmetrically outward along an x-axis until lateral end points 14 such that, in a preferred embodiment, the x-axis extent of the truss-defining conduit system is defined by corridor curbs 16 which may be integrated into drainage modules 18 which include drainage pipes 20 capable of accepting drainage from both the street and modular tree planter boxes 22. Accordingly, in terms of x-axis delineation, the instant conduit 10 will typically have a lateral extent defined by a transit corridor 24, the edges of which are typically defined by curbs 16 and associated drainage means. This x-axis delineation is typically in a range of 20 to 24 feet in the embodiment of FIG. 1.

The depth of the conduit 10 and, thereby, much of the z-axis stability thereof, is defined by the disposition of a crushed rock base 26 within excavated earth 28 at the time of construction of the transit corridor 24.

Integrally formed at the xy plane top of the conduit 10 is a naturally occurring or pre-manufactured road composite 30 which renders the utility conduit system functionally and aesthetically compatible to a base of an ergonomic hybrid transit access corridor 24, as it would exist whether or not the present multi-use conduit 10 were employed. In other words, if, as will frequently be the case, a low speed, small transit vehicle is operated upon surface 30, tracks will be disposed over a section 32 of the conduit, which section typically would have an x-axis width of up to eight feet. From the plane of symmetry 12 of section 32, surface 30 which would have a typical depth of about eight inches and would slope symmetrically outwardly at a grade of about two percent to the x-axis end 14 of the conduit.

As may be noted in FIG. 1, there is provided a plurality of internal sub-conduits varying in size, geometry and position relative to the plane of symmetry 12. Typically disposed within a large central sub-conduit 34 would be water main locations 36 from which drinking water is supplied to the community. The rest of the large central sub-conduit 34 is typically provided for storm water drainage as may become necessary in the event of a flood or water overflow during a fire fighting event or burst water main. Accordingly, central sub-conduit 34 may be understood to include the function of containment in the event of a break of either of the water mains 36.

Viewed laterally outwardly from central sub-conduit 34, there is, in the embodiment of FIG. 1, shown outer smaller sub-conduits 38, 40, 42 and 44. Typically disposed within the lowestmost sub-conduits 40 and 42 would be those utilities that would require the least service and for which the highest degree of vibrational insulation from transit activity at surface 30 is necessary. Therefore, within conduit 40 might be disposed telephone and optic fibre cables, while within sub-conduit 42 might be disposed natural or synthetic gas lines for the transportation of propane or the like. In distinction, the upper sub-conduits 38 and 44 of central section 32 would contain cables for utilities likely to require more frequent service but which are not as vibrational sensitive as utilities disposed within sub conduits 40 and 42. Thereby, within sub-conduit 38 might be disposed electric power cables within conduit 44 might be disposed cable television cables.

There is further shown in FIG. 1 are optional lateral extensions 46 which include sub-conduits 48 and 50. Accordingly, where the lateral extensions 46 are employed, further differentiation of utilities may be provided. For example, residential application cables versus business and industrial application cables. Also, greater stability is provided to the central section 32 when lateral extensions 46 are provided.

With respect to the materials from which the inventive conduit system 10 may be formed, there exist a number of lightweight high strength materials that may be pre-manufactured using state of the art extrusion means. Such materials include high density polyethylene (HDPE) and so-called polyester concrete which is a concrete aggregate material containing quartz and inert mineral fillers bonded together with a polyester resin. The choice of material will generally be a function of the weight of the load applied to the conduit by the surface transit system operating thereon, whether or not a given site is earthquake prone, annual level of rain, and any toxicity or other hazard associated with the utilities carried within the inventive system. In terms of dimensions, a typical x-axis dimension of the system shown in FIG. 1 would be in said range of 20 to 24 feet while the depth thereof would typically be about six feet. Accordingly, a system of this dimension may be conveniently placed beneath or proximally to a transportation corridor without any requirement for change or enlargement of the right-of-way conventionally associated therewith.

Figure 2:
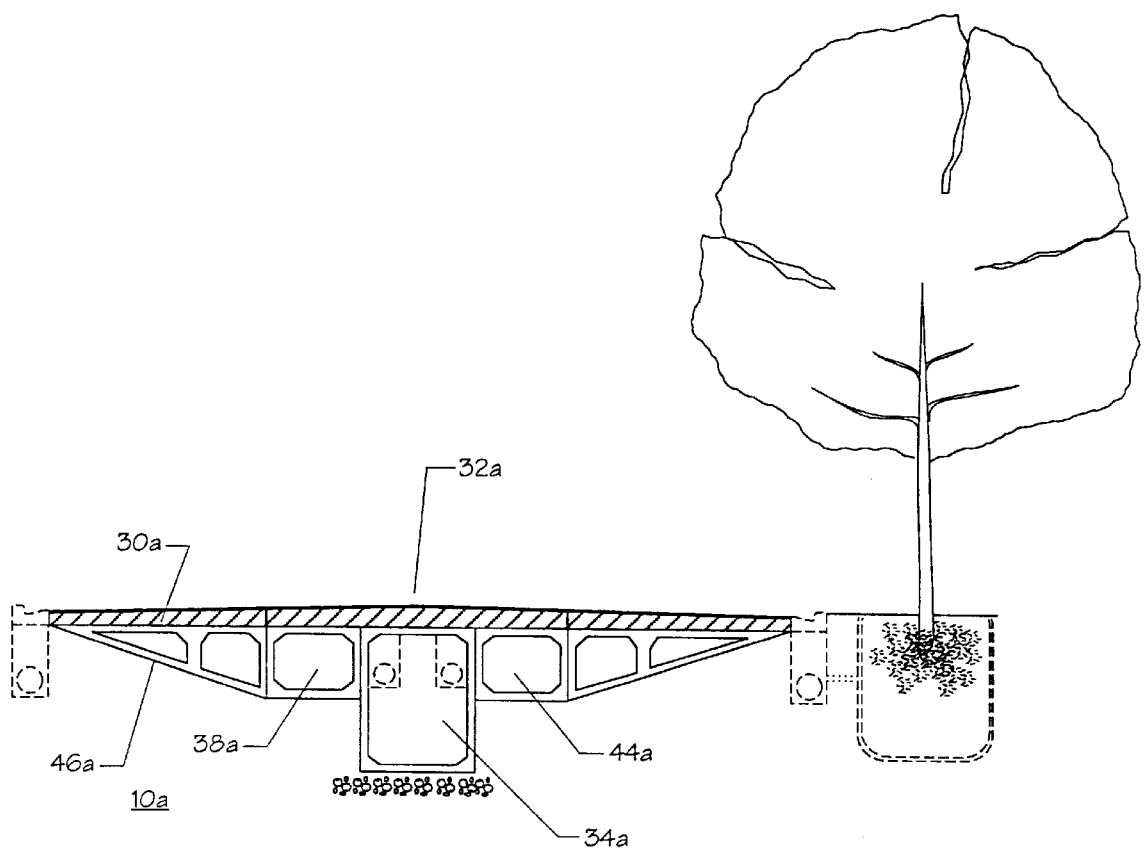
FIG. 2 is a cross-sectional view of a second embodiment thereof adapted to shallow depth applications.

In certain civil engineering applications as, more particularly, where the earth or ground is particularly hard, firm, or rock-like, a conduit system of lesser z-axis depth may be employed. Such a system is shown in FIG. 2. Therein, the number of sub-conduits is reduced from nine to five. However, in many applications, five sub-conduits is an entirely adequate number, particularly where lateral extensions 46a are included with central section 32a of the system. It is noted that surface 30a, in any of the embodiments, may be provided with any of a variety of several surface treatments, that is, blocks or special surface treatments to provide improved architectural integration with the surrounding site.

Figure 3:
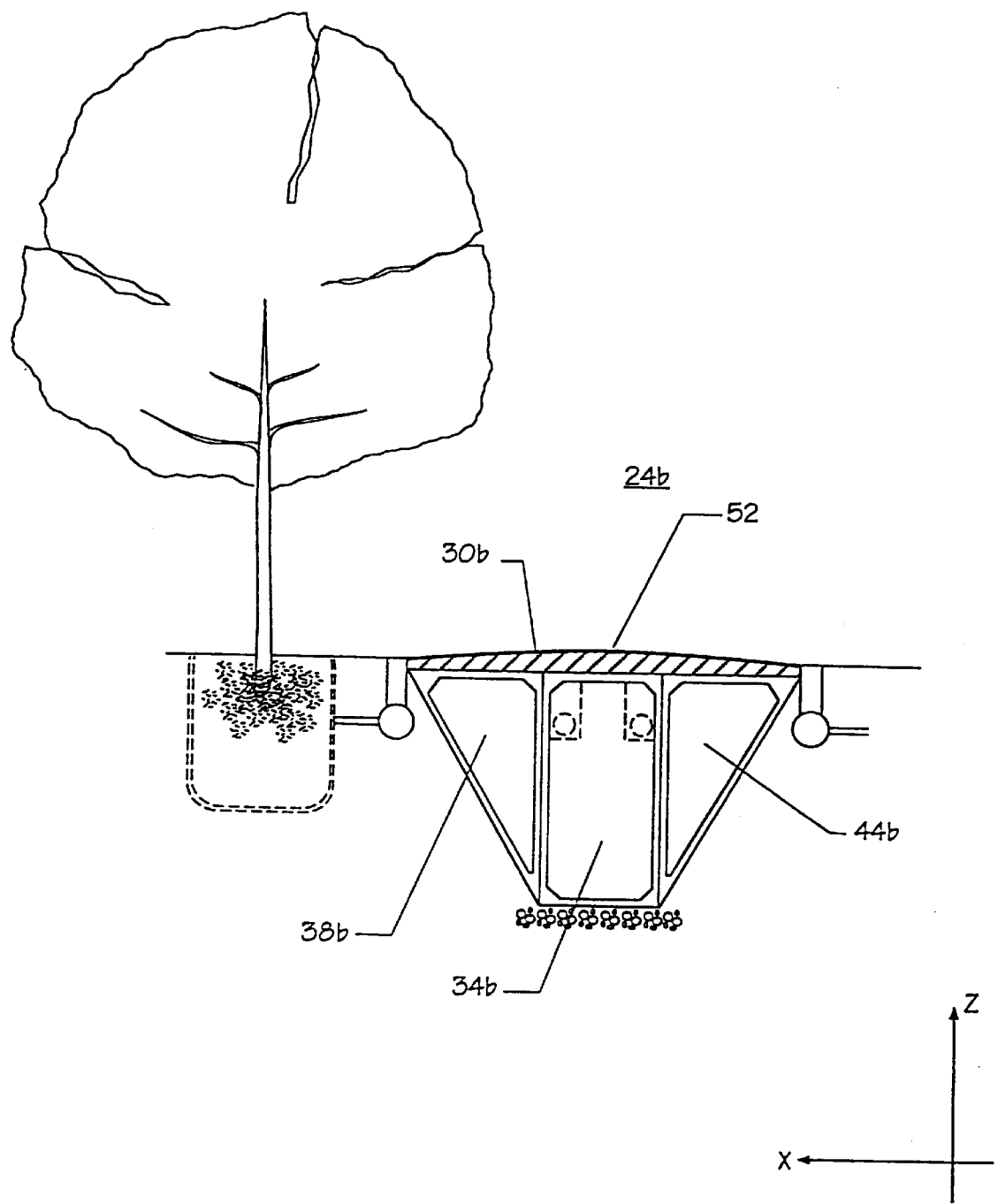
FIG. 3 is a further embodiment of the invention showing the same in standard depth, however, without use of the lateral extensions thereof.
Figure 3A:
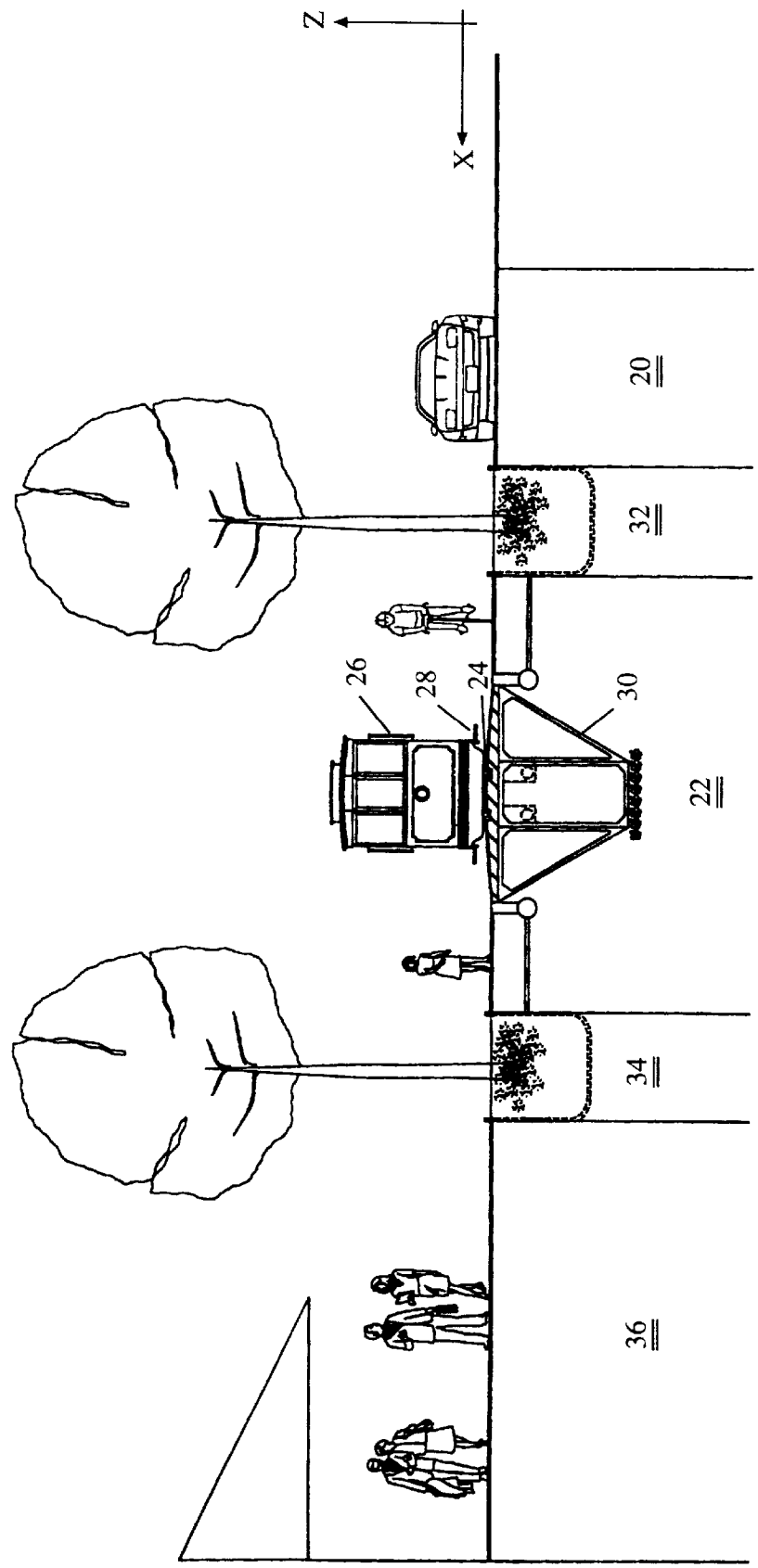
FIG. 3A is a view showing use of the embodiment of FIG. 3 beneath a transportation corridor.

In FIG. 3 is shown a further embodiment the invention which consists of only three sub-conduits, that is, sub-conduits 34b, 38b and 44b. Therein, no lateral extensions sections are employed and a parabolic crown 52 is provided upon the surface 30b. This embodiment of the invention is applicable where smaller right-of-way, e.g., ten feet are employed for the public transit corridor 24b and where a suitable depth, e.g., six feet of an excavation is available. In this embodiment, the sub-conduits 38b and 44b will contain multiple different utility service cables and piping.

Figure 4:
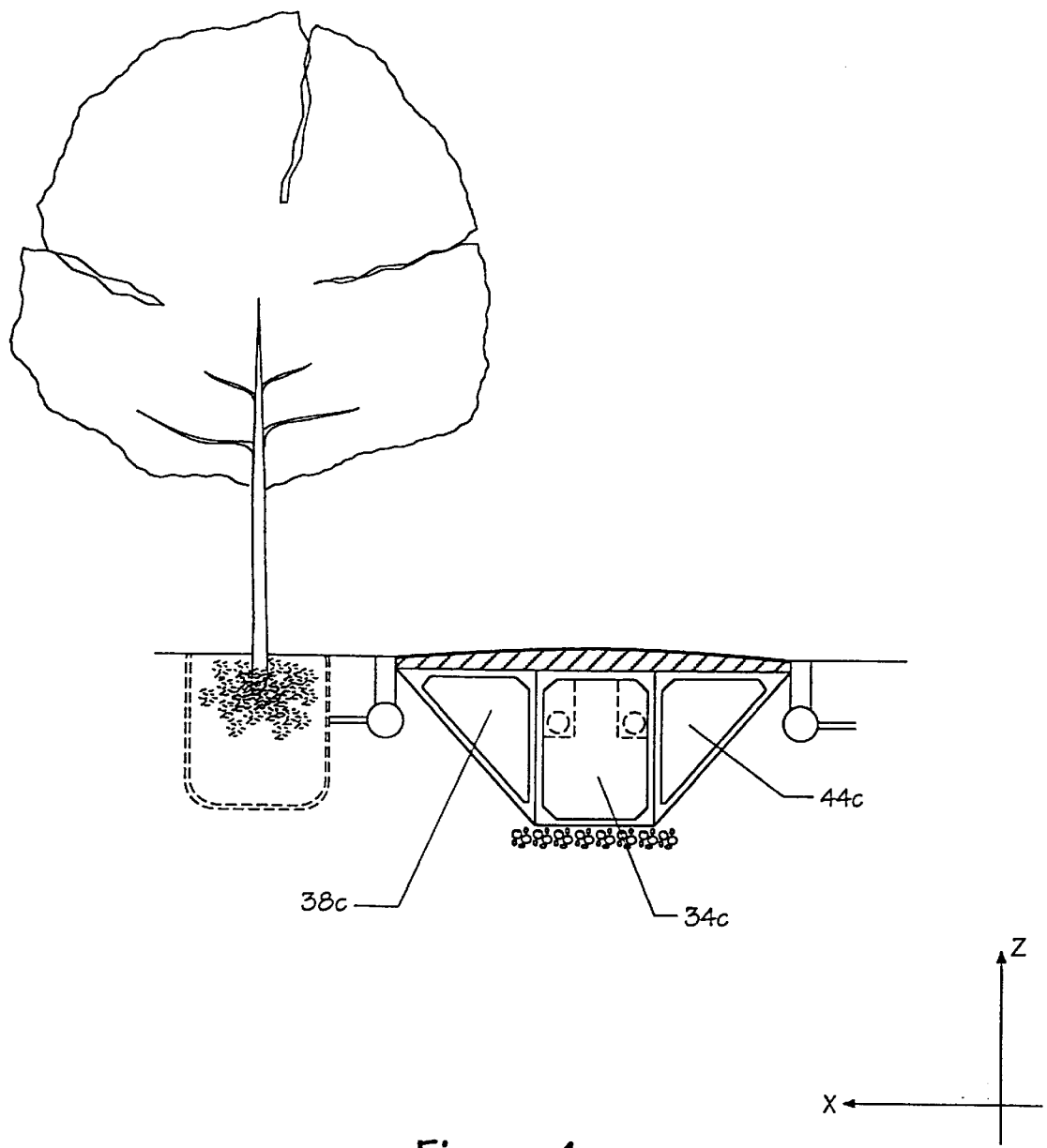
FIG. 4 is a cross-sectional view of a yet further embodiment showing the same without lateral extensions and at said shallow depth of the embodiment of FIG. 2.

In FIG. 4 is shown a further embodiment of the invention which is generally similar to the embodiment of FIG. 3 where however a shallower x-axis dimension, e.g., about four feet, is employed. This embodiment is applicable where the right-of-way is narrow and where the ground or earth is sufficiently dense to accommodate such a reduced depth of the system.

Thereby, from the embodiments of FIGS. 1 to 4, it may be appreciated that the ratio of x to z axis dimension of the xz plane cross-section of the conduit may be in a range of about 1.5:1 to about 6.0:1 the latter or higher part of this range exists when lateral segments 46/46a and 48/48a are employed.

In FIGS. 5 and 6 are shown top plan views of the relationship between the central sections 32 of the present conduit system and the rest of the y-axis length thereof. In other words, it is to be understood that a point of entry 54, substantially in the nature of a manhole, may be provided to a central sub-conduit 34 of central section 32 for purpose of access thereto for service purposes. In other words, since central sub-conduit 34 will typically be empty, and since said sub-conduit 34 will include holes or access points to all adjoining sub-conduits, i.e, sub-conduits 38, 40, 42 and 44, the manhole 54 also provides a means of access thereto and for change in relative directionality of adjoining system segments.

Appropriate sealing 56 using, for example, a flexible sealed expansion gasket formed of a high density elastomeric polymer, may be employed. Central section 32, viewed in the xy plane, will typically have a dimension of five feet on each edge. However, central section 32 may have a rectangular dimension 32d as is shown in FIG. 6. This is advantageous when connection of an angled section 58 to a y-axis linear section 60 is necessary. It is noted that such segments 60 of the inventive conduits, in any of their embodiments, will typically exhibit a length in a range of 16 to 40 feet.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

Having thus described our invention what we claim as new, useful and non-obvious and, accordingly, secure by Letters Patent of the United States is:

1. A method of housing a plurality of utility services within a single unitary channel, the method comprising the steps of:
   (a) disposing a plurality of utility services within a substantially integral longitudinal conduit having therein a plurality of sub-conduits each corresponding to a utility service or utility service group to be provided;
   (b) providing, to earth-embedded surfaces of said integral conduit, means for stabilization of said conduit within the earth; and
   (c) providing, to upwardly directed, non-embedded surfaces of said conduit, a substantially flat surface comprising surface effects to aesthetically and functionally integrate into a surface environment associated with said conduit.

2. The method as recited in claim 1, in which said stabilization providing means of Step (b) above includes the step of:
   providing to said embedded surfaces of said integral conduit, a surface structure symmetric about a longitudinal plane of symmetry of said conduit, to maximize stabilization thereof within the earth.

3. The method as recited in claim 2, further comprising the step of:
   providing selectably attachable lateral sub-conduits to said integral conduit to thereby increase the number of sub-conduits for use with additional utility services.

4. The method as recited in claim 2, further comprising the step of:
   providing, to said non-embedded surfaces of said conduit, means for selectable access to said sub-conduits thereof.

5. The method as recited in claim 4, further comprising the step of:
   providing to said non-embedded surfaces of said conduit a grade, symmetric about said longitudinal plane of symmetry of said conduit, to assist in the run-off of rain water therefrom and to prevent accumulation of such water upon the conduit.

6. The method are recited in claim 5, further comprising the step of:
   defining each transverse cross-section of said integral conduit in terms of a truss, in which said sub-conduits are defined by sub-trusses within said truss.

7. A multi-purpose underground utility conduit system, comprising:
   (a) a unitary longitudinal conduit comprising, in transverse cross-section, a truss-like structure including therein a plurality of sub-trusses which thereby define a corresponding plurality of sub-conduits, in which a plurality of different utility services, or groups thereof, may be respectively disposed within said plurality of sub-conduits;
   (b) earth-embedded exterior surfaces of said unitary conduit, said surfaces including means for stabilization with the earth; and
   (c) non-embedded surfaces of said unitary conduit, said surfaces including a grade symmetric about a vertical longitudinal axis of said conduit, to thereby assist in the run-off of rain water from said non-embedded surfaces and to prevent accumulation of said water thereupon.

8. The system as recited in claim 7, in which said stabilization means comprises:
   exterior surfaces structures of said conduit.

9. The conduit system as recited in claim 7, further comprising:
   upwardly-directed, non-embedded surfaces of said conduit, comprising substantially flat surfaces comprising surface effects to aesthetically and functionally integrate into a surface environment with which said non-embedded surfaces are physically contiguous.

10. The system as recited in claim 9 in which said non-embedded surfaces include a grade, symmetric about said vertical longitudinal axis of said conduit, to thereby assist in the run off of rain water from said surfaces and to prevent accumulation of such water thereupon.

11. The system as recited in claim 7, further comprising:
    selectably attachable lateral extension means, defining in lateral cross-section sub-trusses, to said integral conduit to thereby increase the number of sub-conduits available to conduit system for the inclusion of further utility services therein.

12. The system as recited in claim 7, in which said non-embedded surfaces of said conduit include:
    means for selectable access to said sub-conduits for purposes of maintenance, access and storage of equipment therein.

13. The system as recited in claim 12 in which said integral conduit comprises, in the xz plane, an x-to-z-axis dimension ratio in a range of about 1.5:1 to about 6.0:1.

14. The system as recited in claim 13 in which a y-axis length of said conduit comprises a range of 16 to 40 feet.

* * * * *